United States Patent
Flohr et al.

(10) Patent No.: US 10,180,110 B2
(45) Date of Patent: Jan. 15, 2019

(54) METHOD FOR OPERATING AN INTERNAL COMBUSTION ENGINE BASED ON A CHARACTERISTIC VALUE DETERMINED FROM A LAMDA VALUE, AND INTERNAL COMBUSTION ENGINE

(71) Applicant: MTU FRIEDRICHSHAFEN GMBH, Friedrichshafen (DE)

(72) Inventors: Andreas Flohr, Untersiggingen (DE); Roland Werner, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 23 days.

(21) Appl. No.: 15/506,332

(22) PCT Filed: Aug. 14, 2015

(86) PCT No.: PCT/EP2015/001682
§ 371 (c)(1),
(2) Date: Feb. 24, 2017

(87) PCT Pub. No.: WO2016/030002
PCT Pub. Date: Mar. 3, 2016

(65) Prior Publication Data
US 2017/0268438 A1    Sep. 21, 2017

(30) Foreign Application Priority Data
Aug. 25, 2014  (DE) .................. 10 2014 216 874

(51) Int. Cl.
| F02D 19/08 | (2006.01) |
| F02D 41/14 | (2006.01) |
| F02D 19/02 | (2006.01) |
| F02D 19/06 | (2006.01) |

(Continued)

(52) U.S. Cl.
CPC ......... F02D 19/081 (2013.01); F02D 19/023 (2013.01); F02D 19/029 (2013.01);
(Continued)

(58) Field of Classification Search
CPC ........ F02D 19/00–19/24; F02D 19/026; F02D 19/029; F02D 19/06–19/061;
(Continued)

(56) References Cited

U.S. PATENT DOCUMENTS 9,279,372 B2 * 3/2016 Monros .................... F02B 43/00
9,562,489 B2   2/2017 Taniguchi et al.
(Continued)

FOREIGN PATENT DOCUMENTS

DE   1002008010555 A1   8/2009
EP         2631458 A1   8/2013
(Continued)

*Primary Examiner* — Erick R Solis
*Assistant Examiner* — Robert A Werner
(74) *Attorney, Agent, or Firm* — Lucas & Mercanti, LLP; Klaus P. Stoffel

(57) ABSTRACT

A method for operating an internal combustion engine, having of the following steps: operating the internal combustion engine with a gas fuel; detecting a lambda value in the exhaust gas of the internal combustion engine; determining at least one variable from the detected lambda value, characterizing the quality of the gaseous fuel; and controlling the internal combustion engine based on the at least one variable.

10 Claims, 2 Drawing Sheets

(51) Int. Cl.
*F02D 41/00* (2006.01)
*F02M 21/04* (2006.01)
*F02D 19/10* (2006.01)

(52) U.S. Cl.
CPC ..... *F02D 19/0636* (2013.01); *F02D 19/0647* (2013.01); *F02D 41/0027* (2013.01); *F02D 41/1456* (2013.01); *F02D 19/10* (2013.01); *F02D 41/0025* (2013.01); *F02D 2200/0612* (2013.01); *F02M 21/047* (2013.01); *Y02T 10/32* (2013.01); *Y02T 10/36* (2013.01)

(58) Field of Classification Search
CPC ........ F02D 19/0626; F02D 19/0634–19/0642; F02D 19/08–19/081; F02B 43/00; F02M 21/00; F02M 21/02
USPC ............ 123/299, 300, 304, 525, 575, 27 GE
See application file for complete search history.

(56) References Cited

U.S. PATENT DOCUMENTS

| | | | |
|---|---|---|---|
| 2007/0295316 A1* | 12/2007 | Davis | F02D 19/027 123/689 |
| 2012/0004824 A1* | 1/2012 | Milton | F02B 7/06 701/103 |
| 2014/0303876 A1* | 10/2014 | Taniguchi | F02D 41/1456 701/104 |
| 2015/0300282 A1 | 10/2015 | Otsubo | |

FOREIGN PATENT DOCUMENTS

| | | |
|---|---|---|
| WO | 2013000030 A1 | 1/2013 |
| WO | 2013076811 A1 | 5/2013 |
| WO | 2014083985 A1 | 6/2014 |

* cited by examiner

METHOD FOR OPERATING AN INTERNAL COMBUSTION ENGINE BASED ON A CHARACTERISTIC VALUE DETERMINED FROM A LAMDA VALUE, AND INTERNAL COMBUSTION ENGINE

The present application is a 371 of International application PCT/EP2015/001682, filed Aug. 14, 2015, which claims priority of DE 10 2014 216 874.0, filed Aug. 25, 2014, the priority of these applications is hereby claimed and these applications are incorporated herein by reference.

BACKGROUND OF THE INVENTION

The invention relates to a method for operating an internal combustion engine and to an internal combustion engine.

It is known to operate internal combustion engines with a gaseous fuel, in particular in a dual-substance mode which is also referred to as a bi-fuel mode. It has been shown that the chemical composition of gases available for the operation of such an internal combustion engine is subject to extreme fluctuations. Characteristic values which are characteristic for a quality of the gaseous fuel—such as, for example, the heating value or the stoichiometric air ratio—are subject to fluctuations of up to or even greater than 50%. In order to provide for a controlled operation of the internal combustion engine, a reliable characterization of the gaseous fuel which is used is therefore necessary. In principle, its composition could be ascertained by means of a gas chromatograph and/or a chemical analysis, but corresponding sensors are out of the question for use in the field, due to reasons related to cost and complexity. In principle, it is also possible to measure the combustion process directly in the internal combustion engine. This can take place, for example, by means of cylinder pressure indication or a combustion chamber-side temperature measurement. This approach is very expensive, however, and it is not possible to retrofit existing diesel engines with suitable sensors for the dual-substance mode.

SUMMARY OF THE INVENTION

The problem addressed by the invention is therefore that of creating a method and an internal combustion engine which do not have the aforementioned disadvantages.

The problem is solved, in particular, by creating a method for operating an internal combustion engine, which has the following steps: The internal combustion engine is operated with a gaseous fuel, and a lambda value is detected in the exhaust gas of the internal combustion engine. At least one characteristic value which is characteristic for a quality of the gaseous fuel is determined from the detected lambda value, and the internal combustion engine is controlled on the basis of the at least one characteristic value. Given that the characteristic value, which is characteristic for the quality of the gaseous fuel, is determined from the detected lambda value, the quality of the gaseous fuel can be established in a simple and cost-effective way within the scope of the operation of the internal combustion engine itself, and the internal combustion engine can be controlled according to the established quality of the gaseous fuel. Thus there is no need for either complex external chemical analyses, nor for an expensive measuring sensor system for cylinder pressure indication or combustion chamber-side temperature measurement. Instead, all that is required is a lambda sensor and a suitable design of the control device of the internal combustion engine, such that said internal combustion engine is configured for determining the at least one characteristic value from the detected lambda value and for controlling the internal combustion engine on the basis of this characteristic value. In this case, it is also readily possible to retrofit an existing diesel engine or, in general, an internal combustion engine operating as a compression ignition engine, for a mode using a gaseous fuel, in particular for a dual-substance mode. If the existing internal combustion engine already comprises a lambda sensor, said internal combustion engine only requires an easily configured, additional functionality in a control device of the internal combustion engine, or an additional control device which implements the functionality of the method. If the existing internal combustion engine does not comprise a lambda sensor, however, such a lambda sensor can be readily retrofitted, however.

A lambda value is understood to mean, in this case, in the usual way which is known per se, the combustion air ratio which is also referred to as the air ratio or air/fuel ratio. This refers to the ratio between an air mass which is actually available for the combustion to a stoichiometric air mass which is necessary for complete combustion. The lambda value can be readily detected, in a manner known per se, in the exhaust gas of the internal combustion engine by means of a lambda sensor.

A control of the internal combustion engine is understood to mean, in this case, a control or a regulation of the internal combustion engine. In particular, a quantity of gaseous fuel fed to at least one combustion chamber of the internal combustion engine is preferably controlled or regulated on the basis of the at least one characteristic value.

A gas containing methane, in particular natural gas, biogas, special gas, or another suitable gas, is preferably used as the gaseous fuel. In particular, the use of liquified natural gas (LNG) or a gas consisting primarily of long-chain alkanes, in particular propane and/or butane, for example NGL (natural gas liquids) or LPG (liquified petroleum gas), is possible. A gas mixture can also be used as the gaseous fuel, for example a mixture of compressed natural gas and hydrogen.

In one preferred embodiment of the method, it is provided that the internal combustion engine is operated in a dual-substance mode with a gaseous fuel and a liquid fuel. A diesel fuel, in particular diesel, is preferably used as the liquid fuel.

Preferably, an internal combustion engine which is designed as a compression ignition engine is operated within the scope of the method. In particular, the operation of an internal combustion engine designed as a compression ignition engine in the dual-substance mode with the gaseous fuel, on the one hand, and with the liquid fuel, on the other hand, has great advantages in terms of reduced operating costs and emissions of the internal combustion engine.

Within the scope of the method, preferably a ratio of an energy portion of gaseous fuel to an energy portion of liquid fuel of at least 2:8 to at most 9:1, preferably of at least 1:1 to at most 9:1, preferably of at least 6:4 to at most 8:2, particularly preferably 7:3, is fed to the at least one combustion chamber of the internal combustion engine. In this case, the term "energy portion" refers to a portion, in a fuel, of the chemical energy fed to the combustion chamber, in all, in the form of the fuels. In the dual-substance mode, therefore, a quantity of liquid fuel, the energy portion of which corresponds at least to one-fifth of the total energy to be introduced at a given operating point, is preferably substituted by a quantity of gaseous fuel having this energy portion. With a view to the operating costs of the internal combustion engine and the emissions thereof, the largest possible quantity of liquid fuel is preferably substituted by gaseous fuel, wherein, particularly preferably, a ratio of the energy portions of 7:3, in favor of the gaseous fuel, is implemented. This ratio is also referred to as the substitution rate. The substitution rate is preferably dependent on an instantaneous operating point of the internal combustion engine. Said substitution rate can be retained, however, with the aid of the method—at a given operating point—at least largely independently, preferably independently of the quality of the gaseous fuel which is used at that moment.

In the method, the liquid fuel is preferably not used as ignition oil, however, wherein, in this case, only a small amount of liquid fuel would be fed into the combustion chamber of the internal combustion engine in order to ignite the gaseous fuel. Instead, the internal combustion engine preferably operates as a compression ignition engine, wherein a mixture of the gaseous fuel, the liquid fuel, and the combustion air is ignited in the combustion chamber at the ignition point by means of compression ignition. In this case, the quantity of liquid fuel fed to the combustion chamber is selected in such a way that this is not only a very small quantity or an ignition quantity, but rather a quantity which, at any rate, affects the performance or the output torque of the internal combustion engine. This design has the advantage that an existing internal combustion engine operating as a compression ignition engine, in particular a diesel engine, can be readily retrofitted to the operation within the scope of the method, wherein the operating costs and emissions thereof can be reduced or improved as a result.

One embodiment of the method is also preferred, which is distinguished by at least one parameter being determined as the characteristic value, which is selected from a group consisting of a stoichiometric air requirement of the gaseous fuel, a density of the gaseous fuel, a heating value of the gaseous fuel, an inert gas portion of the gaseous fuel, and a ratio of hydrogen to carbon in the gaseous fuel, which is also referred to as the H/C ratio. Each of these values is already characteristic per se for the quality of the gaseous fuel, in particular for its chemical composition. A controlled operation of the internal combustion engine can therefore be ensured when, in any case, one of these parameters is determined as the characteristic value within the scope of the method and is utilized for controlling the internal combustion engine. It is possible, within the scope of one embodiment of the method, that a combination of some of the parameters mentioned herein or all of the parameters mentioned herein are determined as characteristic values.

One embodiment of the method in which the stoichiometric air requirement of the gaseous fuel which is used is determined as the characteristic value of the stoichiometric air requirement is particularly preferred. This is the ratio of a stoichiometric air quantity necessary for a complete combustion of the gaseous fuel to the entire quantity of gaseous fuel to be combusted. A mass ratio or a volume ratio under standard conditions can be indicated as the stoichiometric air requirement. In particular, it is possible that the stoichiometric air requirement is indicated in units of kilograms of combustion air to kilograms of gaseous fuel or in units of standard cubic meters of combustion air to standard cubic meters of gaseous fuel. It is immediately obvious that the stoichiometric air requirement is characteristic for the portion of combustible substances in the gaseous fuel, and so said stoichiometric air requirement is characteristic for the quality thereof.

Within the scope of one preferred embodiment of the method, the stoichiometric air requirement is determined, as the characteristic value, from the detected lambda value, wherein at least one of the other previously mentioned parameters is derived from the stoichiometric air requirement, in particular is calculated therefrom. In particular, it is possible that the density, the heating value, the inert gas portion and/or the H/C ratio of the gaseous fuel is/are derived from the determined stoichiometric air requirement, in particular is/are calculated or is/are read from program maps or characteristic curves depending on the stoichiometric air requirement. Particularly preferably, all of the aforementioned parameters are derived from the stoichiometric air requirement.

One embodiment of the method is preferred, which is distinguished by the characteristic value being determined by means of a characteristic value regulator, wherein a lambda value calculated on the basis of the characteristic value is regulated, by the characteristic value regulator, by means of variation of the characteristic value to the detected lambda value. This approach has the advantage of a rapid and stable determination of the characteristic value combined with simple implementation. The characteristic value regulator varies the characteristic value—preferably continuously—in a suitable way, in order to adapt the lambda value, which has been calculated on the basis of the characteristic value, to the detected lambda value. In this way, the characteristic value regulator determines, via the variation of the characteristic value, a numerical value therefor, which reliably represents the quality of the gaseous fuel which is used. Preferably, the calculated lambda value is determined on the basis of a first numerical value for the characteristic value, wherein this lambda value is compared to the detected lambda value, and wherein a second numerical value for the characteristic value is calculated on the basis of the comparison by the characteristic value regulator. This is preferably carried out continuously or iteratively. In this case, the characteristic value regulator is initialized at the beginning of the method, preferably with a start value which is selected in such a way that an endangering of the internal combustion engine during operation is ruled out. Since the internal combustion engine is endangered, in particular, by an introduction of an excessive quantity of energy into the combustion chamber, it is initially preferably assumed, for the start value, that a high-quality gas with a high heating value and, therefore, a high stoichiometric air requirement, is used as the gaseous fuel. In this case, the start value can advantageously represent a high quality or the highest actually occurring quality of the gaseous fuels used. If the internal combustion engine is controlled on the basis of this characteristic value, the situation can be prevented in which an excessive quantity of energy is introduced into the combustion chamber. The actual characteristic value of the gaseous fuel which is used is then determined by the characteristic value regulator during the further course of the method, wherein the characteristic value is correspondingly adapted.

If the characteristic value is determined by means of the characteristic value regulator, the calculation of the calculated lambda value is preferably based not only on the characteristic value, but also on at least one of the following variables: a mass of liquid fuel fed to the combustion chamber, a quantity of air fed to the combustion chamber, and the quantity of gas fed to the combustion chamber, in particular either the volume of gaseous fuel fed to the combustion chamber or the mass of gaseous fuel fed to the combustion chamber. Instead of basing the calculation directly on the quantity of air fed to the combustion chamber, it is also possible to utilize the charge air pressure and the charge air temperature, in particular for calculating the volume of the fed combustion air. In addition, a charging behavior of the internal combustion engine is preferably incorporated into the calculation, and, preferably, a stoichiometric air requirement of the liquid fuel.

Alternatively or additionally, it is possible that the characteristic value is calculated by calculating a second numerical value for the characteristic value from a value for a parameter of the internal combustion engine, which is dependent on or derived from a first numerical value for the characteristic value, and from the detected lambda value. In this case, a regulator for the characteristic value can be dispensed with and, instead, a known analytical relationship between the detected lambda value and the characteristic value is used for calculating the characteristic value. The method is preferably carried out continuously or iteratively—in particular with the timing of the engine control unit—and so a new numerical value is always calculated on the basis of the most recently calculated numerical value of the characteristic value. In this approach as well, an initialization is required at the beginning of the method, in order to determine the derived value for the parameter of the internal combustion engine. In this case as well, the start value is preferably selected in such a way that a reliable operation of the internal combustion engine is ensured, wherein a value is preferably utilized, which is characteristic for a gaseous fuel of high quality or of the highest quality to be expected.

A quantity of gaseous fuel fed to the combustion chamber, in particular a fed volume of gaseous fuel, is utilized as the dependent or derived value for a parameter of the internal combustion engine, wherein the gaseous fuel quantity is determined by means of a feed device which is controlled on the basis of the characteristic value and/or a density of the gaseous fuel determined from the characteristic value. The next numerical value for the characteristic value can then be calculated from this dependent or derived value and the detected lambda value. In this case, further variables are preferably incorporated into the calculation, in particular at least one of the following variables: a quantity, in particular mass, of liquid fuel fed to the combustion chamber, and a quantity of combustion air fed to the combustion chamber, in particular a volume—preferably calculated from the charge air temperature and the charge air pressure—of combustion air fed to the combustion chamber.

One embodiment of the method is also preferred, which is distinguished by at least one correction variable for correcting a measured value determining the lambda value being determined from the characteristic value, wherein the detected lambda value is obtained by correcting the measured value. In this case, the measured value is corrected with the correction variable, in particular, and the detected lambda value is calculated from the corrected measured value. In this context it is apparent that lambda sensors typically do not directly measure the lambda value, but rather an oxygen concentration in the exhaust gas. The lambda value is then determined from this measured value. The at least one correction variable is preferably selected from a group consisting of an inert gas portion of the gaseous fuel and its H/C ratio. It is also possible that the inert gas portion is determined from the characteristic value, wherein the H/C ratio is assumed on the basis of certain knowledge of the gaseous fuel, wherein a value averaged over a plurality of gaseous fuels, or a calculated value can be used. One embodiment of the method is also possible, however, in which the lambda value is calculated from the measured residual oxygen concentration and certain assumed values for the inert gas portion and the H/C ratio of the gaseous fuel, without determining a correction variable from the characteristic value. The determination of at least one correction variable from the characteristic value has the advantage, however, that realistic knowledge of the actually present gas properties of the gaseous fuel can also be used as the basis for determining the detected lambda value. Alternatively or additionally, it is preferably provided that the measured value of the lambda sensor is corrected on the basis of the exhaust gas pressure prevailing at the site of the lambda sensor.

One embodiment of the method is also preferred, which is distinguished by the at least one characteristic value being used for controlling a quantity of gaseous fuel to be metered. This approach has the advantage that the quantity of gaseous fuel to be metered can always take place on the basis of a realistic knowledge of the actual quality of the gaseous fuel which is used, wherein an appropriate energy quantity can always be fed to a combustion chamber of the internal combustion engine.

Preferably, the at least one characteristic value is used, in particular, for controlling a gas valve, particularly preferably a gas valve which can be directly controlled —in particular via a CAN bus —with a desired flow rate or volumetric flow rate for the gaseous fuel. In this case, the gas valve is preferably configured for automatically measuring a gas inlet pressure, a gas temperature and, preferably, a pressure difference dropping across the valve, and for determining, from the flow rate or volumetric flow rate transmitted as the specified value, a valve position which is suitable for the implementation thereof. For this purpose, the density oi the gaseous fuel determined as the characteristic value or, in particular, from the characteristic value is preferably transmitted as the parameter for the control to the gas valve. With the aid of such a as valve, which is also known as TecJet valve which is an electronic gas metering valve that has integrated sensors and electronics, a highly precise and, simultaneously, simple control of the quantity of gaseous fuel to be metered is possible.

Preferably, the gaseous fuel is metered into a charge air line of the internal combustion engine upstream from a compressor. It is possible that a venturi mixer is provided at this point of the charge air line, by means of which the gaseous fuel can be mixed with the combustion air. The mixture of gaseous fuel and combustion air generated in this way is then compressed by the compressor and is fed to the at least one combustion chamber of the internal combustion engine. Alternatively, a metering of the gaseous fuel downstream from the compressor or directly upstream from an inflow into the at least one combustion chamber of the internal combustion engine—in particular as manifold injection—is also possible. In this case, a cylinder-specific metering of gaseous fuel can also be provided. Finally, it is also possible that the gaseous fuel is introduced, in particular injected, directly into the at least one combustion chamber. A corresponding metering of the gaseous fuel is also possible, of course, in the case of an internal combustion engine which does not have a compressor.

Within the scope of the method, the liquid fuel is preferably introduced directly into the combustion chamber, in particular via an injector provided for this purpose.

The at least one characteristic value is preferably incorporated into a gaseous fuel lambda value control, by means of which the gas valve is controlled. In addition, a gaseous fuel lambda setpoint value is incorporated into the gaseous fuel lambda value control, which value is read from a map as a function of a torque and a speed of the internal combustion engine. Finally, the metered quantity of gaseous fuel is controlled via the gaseous fuel lambda setpoint value, wherein the at least one characteristic value is utilized for the correction determination thereof. In addition, the gaseous fuel lambda value control is additionally preferably based on the charge air pressure and the charge air temperature.

The result of the gaseous fuel lambda value control is preferably a control value for the gas valve, in particular a flow rate or a volumetric flow rate to be metered via the gas valve. In addition, the result is preferably a gaseous fuel quantity, in particular a gaseous fuel mass or a gaseous fuel volume, introduced into the at least one combustion chamber of the internal combustion engine. This is utilized, preferably together with a quantity, in particular mass, of liquid fuel introduced into the at least one combustion chamber, for a torque calculation, wherein the torque calculated in this way is utilized, in turn, as an input value for the map for determining the gaseous fuel lambda setpoint value.

In addition, the quantity, in particular mass, of liquid fuel to be introduced into the at least one combustion chamber is preferably calculated by means of a speed regulator, wherein the speed regulator has the speed of the internal combustion engine as the input value. This is likewise used, in turn, as an input value for the map for determining the gaseous fuel lambda setpoint value.

It is therefore apparent that the speed of the internal combustion engine is preferably regulated directly via the metered quantity of liquid fuel, wherein this regulation can take place very quickly, in particular in real time, and highly precisely, in a manner which is typical for compression-ignition internal combustion engines, in particular diesel engines. With the adaptation, by the speed regulator, of the mass of liquid fuel introduced into the at least one combustion chamber, the determined torque also changes, which ultimately affects the gaseous fuel lambda setpoint value read from the map, which value, in turn, having been transmitted via the gaseous fuel lambda value control, affects the metering of the gaseous fuel by means of the gas valve. If the load point of the internal combustion engine is therefore shifted, said internal combustion engine adapts to the changed load point initially by adjusting the fed mass of liquid fuel, wherein an adjustment of the metered quantity of gaseous fuel also takes place downstream.

In this case, a transient monitoring device is preferably provided, by means of which a ratio of the total combustion air to the total quantity of fuel—i.e., gaseous fuel and liquid fuel—is limited downward, i.e., toward richer mixture compositions.

The problem is also solved, in particular, by creating an internal combustion engine which comprises a controllable feed device for a gaseous fuel—indirectly or directly—into at least one combustion chamber of the internal combustion engine. An exhaust gas train connected to the combustion chamber is provided, wherein the internal combustion engine has a lambda sensor situated in the exhaust gas train. In addition, the internal combustion engine comprises a control device which is configured for detecting a lambda value in the exhaust gas of the internal combustion engine, for determining at least one characteristic value which is characteristic for a quality of the gaseous fuel from the detected lambda value, and for controlling the internal combustion engine on the basis of the at least one characteristic value. The advantages which were already explained in conjunction with the method also result in conjunction with the internal combustion engine.

The feed device for the gaseous fuel is preferably provided upstream from a compressor in the charge air train of the internal combustion engine. In this case, the feed device preferably comprises a gas valve, in particular a so-called TecJet valve which is an electronic gas metering valve that has integrated sensors and electronics, the preferred functionality of which is described in greater detail, in particular, in conjunction with the method.

The control device is operatively connected to the feed device for the control thereof, on the one hand and, on the other hand, is operatively connected to the lambda sensor for detecting the lambda value in the exhaust gas train. In particular, the control device is configured for carrying out a method according to one of the above-described embodiments.

In this case, it is possible that such a method is fixedly implemented in an electronic structure, in particular a hardware, of the control device. Alternatively or additionally, it is possible that a computer program product is loaded into the control device, which comprises instructions, on the basis of which such a method is carried out when the computer program product runs on the control device.

It is possible that the control device is designed as an engine control unit (ECU) of the internal combustion engine. Alternatively, it is possible that the internal combustion engine comprises a separate control device for carrying out the method.

The control device preferably has a knock control means which is preferably operatively connected to at least one structure-borne noise sensor for knock detection. It is possible that a separate structure-borne noise sensor for cylinder-specific knock detection is assigned to each combustion chamber of the internal combustion engine. Preferably the knock control means is configured for reducing the substitution rate—in particular in a cylinder-specific manner—when a knocking combustion is detected.

The internal combustion engine is preferably configured as a compression-ignition internal combustion engine and is designed, in particular, for dual-substance operation. For this purpose, the internal combustion engine preferably comprises a liquid fuel feed device, in particular at least one injector for at least one combustion chamber of the internal combustion engine, in particular for each combustion chamber at least one injector assigned to the combustion chamber.

The internal combustion engine is preferably designed as a four-stroke piston engine having a plurality of cylinders, in particular four, six, eight, twelve, sixteen, eighteen or twenty cylinders. An internal combustion engine of the type discussed herein is used, particularly preferably, in a stationary operation, in particular in the sector of the production of fossil fuels, particularly preferably in the sector of oil and/or gas production. In this case, it is particularly preferably possible, within the scope of production, to use produced gas as the gaseous fuel for the internal combustion engine. The internal combustion engine is preferably configured as a pump drive, for example as a drive for a fire extinguisher pump, for a drive of a dredging pump, for power generation, and/or for introducing a means for hydraulic fracturing (fracking) into a bore.

One exemplary embodiment of the internal combustion engine is preferred, which is distinguished by the lambda sensor being designed as a broadband lambda sensor. As a result, it is possible, in particular, to operate the internal combustion engine with a lean mixture of fuel and combustion air. During the operation of the internal combustion engine, a lambda value of at least 1.7 to at most 3.5, preferably of at least 2 to at most 3, particularly preferably 2.4, is preferably implemented.

Finally, one exemplary embodiment of the internal combustion engine is preferred, which is distinguished by a metering device for metering liquid fuel directly into the combustion chamber—in particular an injector—being assigned to the at least one combustion chamber. Preferably, such a metering device is assigned to each combustion chamber of the internal combustion engine. In this manner, a cylinder-specific metering of liquid fuel is possible, in particular.

The internal combustion engine is preferably designed as a piston engine, as described above. In yet another preferred exemplary embodiment, the internal combustion engine is used for driving, in particular, heavy land vehicles or watercraft, for example, mining vehicles and trains, wherein the internal combustion engine is used in a locomotive or a railcar, or for driving ships. A use of the internal combustion engine for driving a defense vehicle, for example, a tank, is also possible. Yet another exemplary embodiment of the internal combustion engine is preferably used in a stationary manner, for example, for stationary power supply in an emergency power supply mode, continuous duty operation or peak load operation, wherein the internal combustion engine preferably drives a generator in this case. A stationary application of the internal combustion engine for driving auxiliary assemblies, for example, fire extinguisher pumps on oil platforms, is also possible. In addition, an application of the internal combustion engine—as described above—in the sector of the production of fossil raw materials and, in particular, fossil fuels, for example, oil and/or gas, is possible. A use of the internal combustion engine in the industrial sector or in the construction sector, for example in a construction machine, for example, in a crane or an excavator, is also possible.

The description of the method, on the one hand, and of the internal combustion engine, on the other hand, are intended to be understood to be complementary to one another. In particular, features of the internal combustion engine which were described explicitly or implicitly in conjunction with the method, are preferably features, individually or combined with one another, of a preferred exemplary embodiment of the internal combustion engine. Method steps which were described explicitly or implicitly in conjunction with the internal combustion engine are preferably—individually or combined with one another—steps of one preferred embodiment of the method. This is preferably distinguished by at least one method step which results from at least one feature of the internal combustion engine. The internal combustion engine is preferably distinguished by at least one feature which results from at least one method step of one preferred embodiment of the method.

The invention is explained in greater detail in the following with reference to the drawing. In the drawing

DETAILED DESCRIPTION OF THE INVENTION

Figure 1:
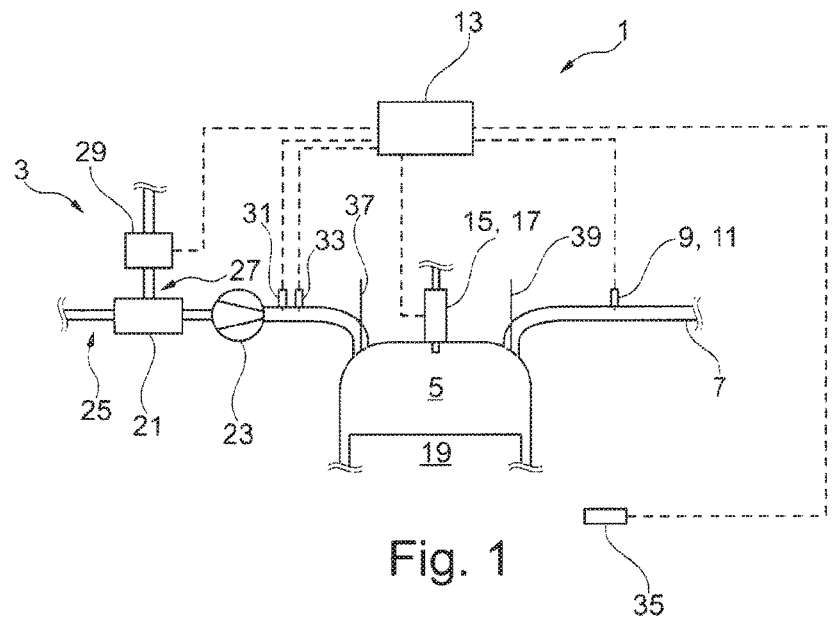
FIG. 1 shows a schematic representation of one exemplary embodiment of an internal combustion engine.

FIG. 1 shows a schematic representation of one exemplary embodiment of an internal combustion engine 1 comprising a controllable feed device 3 which is configured for—indirectly—feeding a gaseous fuel into a combustion chamber 5 of the internal combustion engine 1. Connected to the combustion chamber 5 is an exhaust gas train 7, wherein a lambda sensor 9, in particular a broadband lambda sensor 11 in this case, is situated in the exhaust gas train 7. In addition, a control device 13 is provided, which is configured for detecting a lambda value in the exhaust gas of the internal combustion engine 1, and for determining, from the detected lambda value, at least one characteristic value which is characteristic for a quality of the gaseous fuel. The control device 13 is also configured for controlling the internal combustion engine 1 on the basis of the at least one characteristic value.

For this purpose, the control device 13 is operatively connected to the lambda probe 9, in particular, and to the feed device 3.

The internal combustion engine 1 is also configured for operation in a dual-substance mode, wherein the gaseous fuel as well as a liquid fuel can be fed to the combustion chamber 5. For this purpose, the internal combustion engine 1 comprises a metering device 15, in particular an injector 17, by means of which the liquid fuel can be metered directly into the combustion chamber 5.

The internal combustion engine 1 is preferably designed as a piston engine, in particular as a four-stroke engine, wherein a piston 19 is displaceably situated in the combustion chamber 5 in a manner known per se. Preferably, the internal combustion engine 1 comprises a plurality of combustion chambers 5 and pistons 19, which are displaceably situated therein, wherein one metering device 15 for the cylinder-specific injection of liquid fuel is preferably assigned to each combustion chamber 5. Likewise, a piston 19 is separately assigned to each combustion chamber 5, of course.

In the exemplary embodiment represented here, the feed device 3 comprises a venturi mixer 21 which is situated upstream from a compressor 23 in a charge air line 25. Combustion air can be fed into the venturi mixer 21 via the charge air line 25.

Gaseous fuel can be fed to the venturi mixer 21 via a gas supply line 27, wherein situated in the gas supply line 27 is a gas valve 29 which is operatively connected to the control device 13 and, therefore, can be controlled thereby. The gas valve 29 is preferably designed. as a. so-called TecJet valve which is an electronic gas metering valve that has integrated sensors and electronics, wherein said valve controlled. by the control device 13 —preferably via a CAN bus —with a gaseous-fuel volumetric flow rate to be set, wherein the gas valve 29 automatically determines a gaseous fuel pressure prevailing upstream from the gas valve 29, a temperature of the gaseous fuel, and a differential pressure dropping across the gas valve 29, and sets a suitable valve position in order to implement the volumetric flow rate of the gaseous fuel —which was previously determined and was specified by the control device 13 —through the gas valve 29. For this purpose, additionally preferably, a density determined as the characteristic value or from the characteristic value is fed, as the parameter for the control, to the gas valve 29.

In one preferred exemplary embodiment of the internal combustion engine 1, the compressor 23 is designed as a supercharger. In another exemplary embodiment of the internal combustion engine 1, it is possible that the compressor 23 is designed as a compressor of an exhaust gas turbocharger which can be driven by a turbine which is not represented in FIG. 1 and which is situated in the exhaust gas train 7.

The feed device 3 is preferably provided upstream from a proportioning of the combustion air/gaseous fuel mixture generated by the venturi mixer 21 to the individual combustion chambers 5, therefore jointly for all combustion chambers 5. In another exemplary embodiment, it is possible that a combustion chamber-specific gas feed device 3 is provided, either in the form of a cylinder-specific manifold injection, or in the form of an injection directly into the individual combustion chambers 5, in particular with the aid of gas injectors provided for this purpose. In this case, it is also possible that the internal combustion engine 1 does not comprise a compressor.

The control device 13 is preferably designed as an engine control unit (ECU) of the internal combustion engine 1.

The control device 13 is operatively connected to a charge pressure sensor 31 and a charge air temperature sensor 33 in order to detect a quantity of combustion air fed to the combustion chamber 5, in particular a volume of combustion air fed to the combustion chamber 5. In the exemplary embodiment represented here, said charge pressure sensor and charge air temperature sensor are situated downstream from the compressor 23 and, in particular, downstream from the venturi mixer 21. Since the internal combustion engine 1 is preferably operated with a lean mixture having an excess quantity of combustion air, it is possible, despite the gaseous fuel present at this point in the charge air line 25, to determine a sufficiently precise value for the quantity of combustion air fed to the combustion chamber 5 with the aid of the sensors 31, 33.

The control device 13 is also operatively connected to the metering device 15, in order to be able to control a quantity of liquid fuel fed to the combustion chamber 5.

In addition, a speed sensor 35 is also provided, to which the control device 13 is operatively connected in order to detect a speed of the internal combustion engine 1.

The charge air line 25 is fluidically connected to the combustion chamber 5 via at least one inlet valve 37, wherein the exhaust gas train 7 is fluidically connected to the combustion chamber 5 via at least one outlet valve 39.

Given that the control device 13 is configured for determining, from the lambda value detected by means of the lambda sensor 9, a characteristic value which is characteristic for the quality of the gaseous fuel, it is always possible to control the gas valve 29 in such a way that a suitable quantity of gaseous fuel is fed to the combustion chamber 5 with consideration for the quality of the gaseous fuel, on the one hand, and, on the other hand, with consideration for the present operating point of the internal combustion engine. There is no need, in this case, for either a complex chemical analysis of the gaseous fuel which is used, or a cylinder pressure indication or a temperature measurement in the combustion chamber 5 in order to determine the combustion properties of the gaseous fuel.

Figure 2:
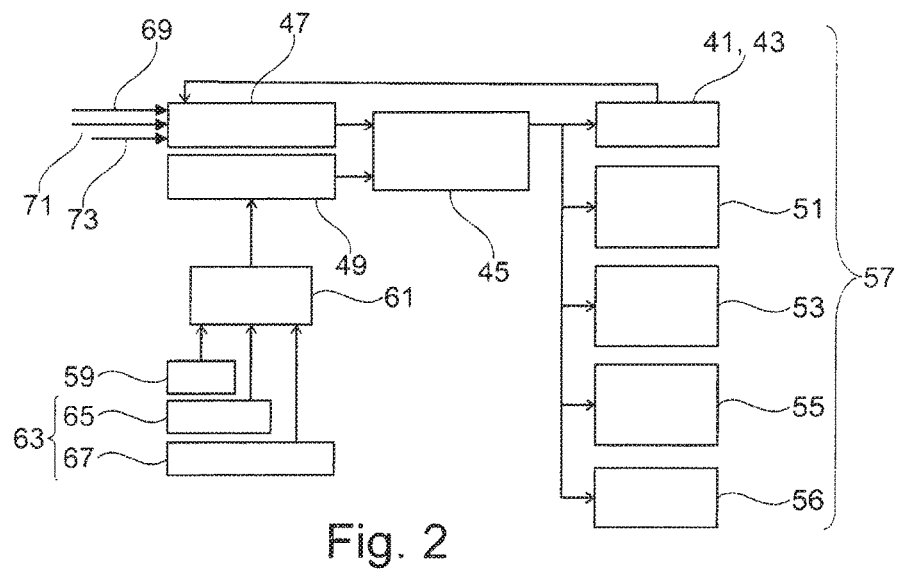
FIG. 2 shows a schematic detailed representation of one first embodiment of the method.

FIG. 2 shows a schematic detailed representation of one first embodiment of the method. In this case, the characteristic value 41, which, in this embodiment is, in fact, the stoichiometric air requirement 43 of the gaseous fuel, is determined by means of a characteristic value regulator 45. For this purpose, a lambda value 47 calculated on the basis of the characteristic value is compared with the lambda value 49 detected by means of the lambda sensor 9, wherein the characteristic value regulator 45 varies the characteristic value 41 in such a way that the calculated lambda value 47 is regulated to the detected lambda value 49. A deviation between the calculated lambda value and the detected lambda value 49 is therefore minimized by the characteristic value regulator 45 by adjusting the characteristic value 41. In this way, a characteristic value 41 which characterizes the quality of the gaseous fuel which is actually used, in this case the stoichiometric air requirement 43 thereof, in particular, is obtained.

This regulating method is preferably carried out continuously and permanently. In this case, the regulation is initialized, upon a start of the method, initially with a characteristic value 41 which corresponds to a high or the highest expected, realistic quality of the gaseous fuel, in this case, i.e., a high or the highest expected stoichiometric air requirement 43. It is therefore assumed that a gaseous fuel of the highest possible quality is used, which results in the quantity of gaseous fuel ultimately fed to the combustion chamber 5 initially being too low, but definitely not too great, and so the combustion chamber 5 is protected against an introduction of an undesirably high quantity of energy and, therefore, the internal combustion engine 1 is protected against damage. Due to the characteristic value regulator 45, the characteristic value 41 is then adapted, in the subsequent course of the method, to the actual value for the gaseous fuel which is actually used.

Within the scope of the method, at least one further characteristic variable for the gaseous fuel is determined from the stoichiometric air requirement 43 determined by means of the characteristic value regulator 45, in particular is calculated and/or preferably read from a map or a characteristic curve, in particular, in the exemplary embodiment represented here, a density 51, a heating value 53, an inert gas portion 55, and an H/C ratio 56 of the gaseous fuel. The characteristic values which are characteristic for the gaseous fuel and which are determined in this way can all be combined as gas properties 57.

Within the scope of the embodiment represented here, the detected lambda value 49 is determined in the following way: The lambda sensor 9 transmits, to the control device 13, a measured value 59 which determines the lambda value, in this case, specifically an oxygen concentration in the exhaust gas of the internal combustion engine 1. The detected lambda value 49 is calculated in a lambda value calculation step 61, preferably by the control device 13, wherein the calculation is based at least on one correction variable 63, by means of which the measured value 59 is corrected, in this case, specifically two correction variables 63, specifically a—preferably average—H/C ratio 56 of the gaseous fuel and an inert gas correction value 67. In this case, it is possible that the H/C ratio 65 and the inert gas correction value 67—in particular as average values for different gaseous fuels—are assumed. Alternatively, it is possible that at least one of the two correction variables 63 is determined from the stoichiometric air requirement 43. In particular, it is possible that the inert gas portion 55 is used as the inert gas correction value 67, or that the inert gas portion 55 determined from the stoichiometric air requirement 43 is utilized for calculating the inert gas correction value 67. It is also possible that the H/C ratio 56 determined from the stoichiometric air requirement 43 is used as the correction variable 63. Alternatively or additionally, the measured value 59 is also corrected with the exhaust gas pressure measured at the location of the lambda sensor 9, for the detection of which the internal combustion engine 1 preferably comprises an exhaust gas sensor which is situated in the direct vicinity of the lambda sensor 9 and is preferably operatively connected to the control device 13.

It is also apparent that also incorporated into the calculation of the lambda value 47 calculated from the characteristic value 41 are a liquid-fuel mass 69 fed to the combustion chamber 5, a gaseous-fuel quantity 71 fed to the combustion chamber 5, in particular a gaseous-fuel mass or a gaseous-fuel volume, and a combustion-air quantity 73 fed to the combustion chamber 5, in particular a combustion-air mass or a combustion-air volume. In addition, it is possible that a charging behavior of the internal combustion engine 1 and the stoichiometric air requirement of the liquid fuel are incorporated into the calculation of the calculated lambda value 47.

Figure 3:
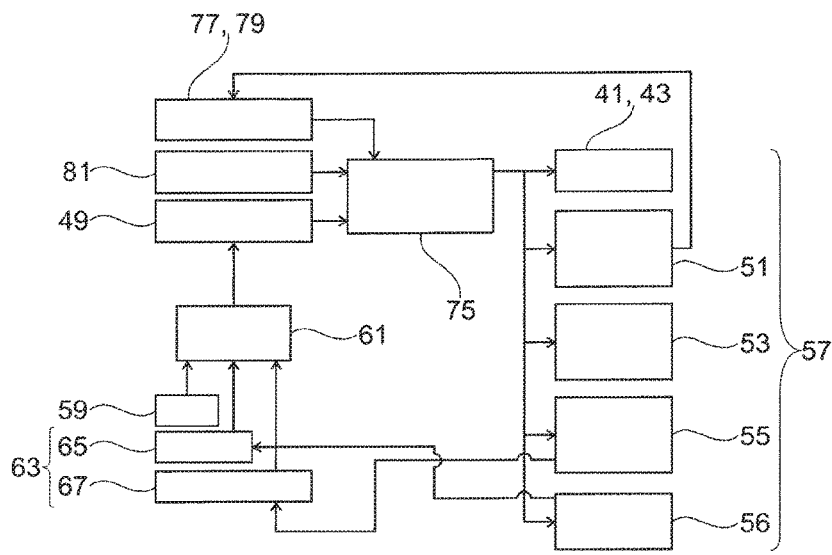
FIG. 3 shows a schematic detailed representation of one second embodiment of the method.

FIG. 3 shows a detailed representation, which is similar to FIG. 2, of a second embodiment of the method. Identical and functionally identical elements are provided with identical reference numbers, and therefore reference is made in this regard to the description provided above. In contrast to the first embodiment according to FIG. 2, in this case, the characteristic value 41, specifically the stoichiometric air requirement 43 of the gaseous fuel, is calculated by means of a characteristic value calculating step 75 by calculating, from the present value of the characteristic value 41, a value 77 for a parameter of the internal combustion engine 1 and, from the detected lambda value 49, a new value for the characteristic value 41. This procedure is carried out iteratively. Specifically, it is apparent here that a gaseous-fuel volume 79, which results from the control of the gas valve 29 and is fed to the combustion chamber 5 in the previous iteration step, is utilized as the value 77 for the parameter of the internal combustion engine 1, wherein the density 51 derived from the stoichiometric air requirement 43 is utilized for a correct metering, wherein a new value for the stoichiometric air requirement 43 is calculated, by means of the characteristic value calculation step 75, from the gaseous-fuel volume 79 and further variables 81, which are combined in this case, and from the detected lambda value 49. The variables 81 are preferably a mass of liquid fuel fed to the combustion chamber 5 and a volume of combustion air fed to the combustion chamber 5. In this case, the stoichiometric air requirement 43 is calculated in the characteristic value calculation step 75, preferably according to the following formula:

$$L_{St\ddot{o}Gas} = \frac{V_L - \lambda_A \frac{m_{Fl}}{\rho_L} L_{St\ddot{o}Fl}}{\lambda_A V_{Gas}}, \quad (1)$$

wherein $L_{St\ddot{o}Gas}$ is the stoichiometric air requirement of the gaseous fuel, $L_{St\ddot{o}Fl}$ is the stoichiometric air requirement of the liquid fuel, $m_{Fl}$ is the mass of liquid fuel fed to the combustion chamber 5, $\rho_L$ is the density of the combustion air fed to the combustion chamber 5, $V_{Gas}$ is the volume of gaseous fuel fed to the combustion chamber 5, $V_L$ is the volume of combustion air fed to the combustion chamber 5, and $\lambda_A$ is the lambda value detected in the exhaust gas train 7.

In FIG. 3, it is also indicated that the inert gas portion 55 determined from the stoichiometric air requirement 43 is used for calculating the inert gas correction value 67 or is used as the inert gas correction value 67.

Figure 4:
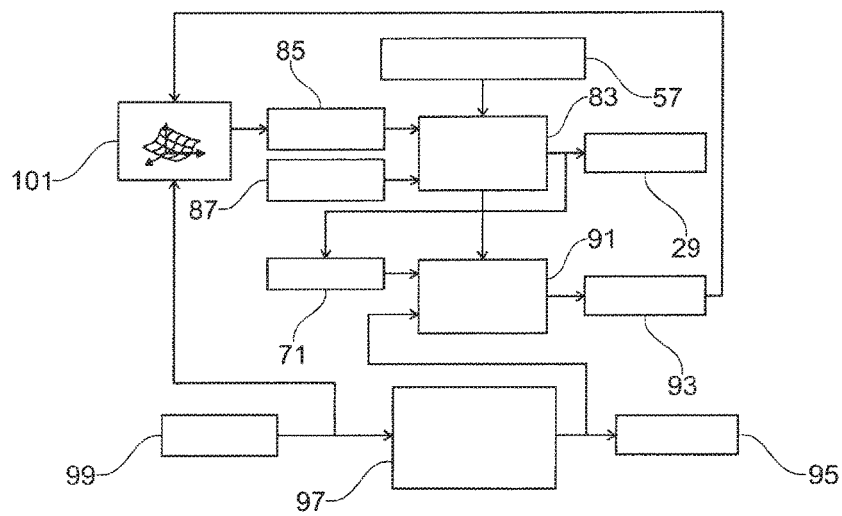
FIG. 4 shows one further detailed representation of the method.

FIG. 4 shows a further schematic detailed representation of one embodiment of the method. Identical and functionally identical elements are provided with identical reference numbers, and therefore reference is made in this regard to the description provided above. On the basis of FIG. 4, it is apparent that the gas properties 57 determined according to one of the above-described embodiments of the method, in particular the characteristic value 41, are used for controlling a quantity of gaseous fuel to be metered. For this purpose, said properties are fed to a gaseous fuel lambda value control 83, by means of which the gas valve 29 is controlled. The gaseous fuel lambda value control ultimately determines the quantity of gaseous fuel fed to the combustion chamber 5 by means of a suitable control of the gas valve 29. Also incorporated into the gaseous fuel lambda value control 83 are a gaseous fuel lambda value setpoint value 85 and further parameters 87 which characterize a quantity of combustion air fed to the combustion chamber 5. In the exemplary embodiment represented here, said further parameters are, in particular, the charge pressure and the charge air temperature and, preferably, the speed of the internal combustion engine 1, the air requirement for the combustion chamber 5, the number of combustion chambers 5, the displacement of the internal combustion engine 1, and/or at least one further relevant variable.

On the basis of the gaseous fuel lambda setpoint value 85 and the parameter 87, the gaseous fuel lambda value control 83 calculates, with consideration for the gas properties 57, a quantity of gaseous fuel to be metered, in particular a desirable setpoint volumetric flow rate for the gaseous fuel, by means of which the gas valve 29 is controlled. In this case, it is obvious that the quantity of gas to be introduced into the combustion chamber 5 in order to achieve the gaseous fuel lambda setpoint value 85 depends on the quality of the gaseous fuel and, highly particularly, on its stoichiometric air requirement 43. In addition, the gaseous fuel lambda value control 83 calculates the gaseous-fuel quantity 71 fed to the combustion chamber 5, in particular a gaseous-fuel volume or a gaseous-fuel mass, which is utilized in a torque determination element 91 in order to determine a torque 93 of the internal combustion engine 1. In addition, a liquid-fuel mass 95 fed to the combustion chamber 5 is incorporated into the torque determination element 91. On the basis of the liquid-fuel mass 95 and the gaseous-fuel quantity 71, the torque determination element 91 calculates the present torque 93 of the internal combustion engine 1.

The liquid-fuel mass 95 is calculated by means of a speed regulating element 97 which has, as the input variable, the speed 99 of the internal combustion engine 1 detected by means of the speed sensor 35.

The speed 99 and the torque 93 are also input variables of a gaseous fuel lambda setpoint value map 101, in which values for the gaseous fuel lambda setpoint value 85 are stored as a function of the torque 93 and the speed 99, and from which the gaseous fuel lambda setpoint value 85 is read.

In all, with respect to the specifically represented exemplary embodiment, the following is apparent: The speed 99 of the internal combustion engine 1 is regulated by means of a variation of the liquid-fuel mass 95 fed to the combustion chamber 5. A speed regulation which is typical for diesels therefore takes place, which can be carried out in real time, i.e., very rapidly and very simply and precisely. If a higher load is requested of the internal combustion engine 1, for example, the speed 99 tends to decrease. In this case, the liquid-fuel mass 95 is increased by means of the speed regulating element 97, whereby the torque 93 of the internal combustion engine 1 increases, and therefore the speed 99 can be held constant. The increase in the torque 93 is registered by the torque determination element 91. Due to the higher torque 93, a changed gaseous fuel lambda setpoint value 85 is read from the gaseous fuel lambda setpoint map 101, preferably a lower gaseous fuel lambda setpoint value, which results in the gas valve 29 being controlled, by the gaseous fuel lambda value control 83, to meter a greater quantity of gaseous fuel. Therefore, the gaseous-fuel quantity 71 fed to the combustion chamber 5 also increases. This, in turn, results in another increase in the torque 93, which tends to result in an increase in the speed 99. Said increase in speed is detected by the speed regulating element 97, however, which can therefore reduce the liquid-fuel mass 95 fed to the combustion chamber 5. If the internal combustion engine 1 has a load drop, a reduction in the liquid-fuel mass 95 therefore takes place first, followed by a reduction of the gaseous-fuel quantity 71.

In all, a very rapid, diesel-typical speed and/or power regulation of the internal combustion engine 1 can therefore take place, wherein, on the other hand, the substitution rate can be adjusted in an individualized manner for different operating or load points of the internal combustion engine 1 by means of the gaseous fuel lambda setpoint value map 101. In addition, the substitution rate can be held at least approximately constant, preferably constant at a given load point independently of, or at least essentially independently of a quality of the gaseous fuel which is used.

In this case, a transient monitoring device, which is not represented in FIG. 4, monitors to ensure that an excessive liquid-fuel mass 95 is not introduced into the combustion chamber 5 by means of the speed regulating element 97.

It is also apparent that the liquid-fuel mass 95 in the preferred exemplary embodiment represented here is not incorporated, as an input variable, into the gaseous fuel lambda value control 83. This is not required, because a resultant effect on the total lambda value of the internal combustion engine 1 and, therefore, indirectly on the gaseous fuel lambda value assigned to the gaseous fuel, can be depicted by means of a suitable data input into the gaseous fuel lambda setpoint value map 101. Alternatively, it is also possible, however, that the liquid-fuel mass 95 is incorporated as an additional input parameter into the gaseous fuel lambda value control 83.

Due to the control represented in FIG. 4, the internal combustion engine 1 has a greater transient capability than a charge-regulated gasoline engine. Rather, a diesel-typical power and/or torque regulation, along with the associated high transient capability, is possible. In particular, it is possible to readily retrofit a diesel engine for the operation within the scope of the method represented here.

In one preferred embodiment of the method, the speed 99 is also incorporated, as an input variable, into the torque determination element 91. In this case, the speed can be utilized, in particular, for determining an instantaneous engine efficiency for the internal combustion engine 1.

Given that, within the scope of the method proposed herein, the gas properties 57, in particular the stoichiometric air requirement 43 of the gaseous fuel, can be determined in a very simple and, simultaneously, reliable way, it is also possible—without carrying out a gas analysis or cylinder-internal measurement in advance—to reliably operate the internal combustion engine 1 even with greatly varying gas qualities. The method is preferably carried out continuously and permanently during operation of the internal combustion engine 1, in particular because the gas quality of the gaseous fuel can also change during the operation of the internal combustion engine 1. It is also possible within the scope of the method to hold a substitution rate for the liquid fuel, in particular a diesel substitution rate, approximately constant, independently of a quality of the gaseous fuel which is used. In addition, due to the knowledge of the quality of the gaseous fuel, it is possible at all, for the first time, to correctly determine the power of the internal combustion engine 1. In this case, complex measurement technology can be dispensed with, which results in cost savings. The engine torque and the gaseous fuel lambda value—i.e., in particular, the lambda value of the gaseous fuel before the introduction of the mixture of gaseous fuel and combustion air into the combustion chamber 5—can be determined sufficiently well, and therefore a stable engine running of the internal combustion engine 1 can be achieved despite an initially unknown gas composition.

The invention claimed is:

1. A method for operating an internal combustion engine having a combustion chamber, comprising the steps of:
   operating the internal combustion engine in a dual-substance mode with a gaseous fuel and a liquid fuel;
   detecting a lambda value in exhaust gas of the internal combustion engine;
   determining at least one characteristic value, which is characteristic for a quality of the gaseous fuel, from the detected lambda value; and
   controlling a gas valve of the internal combustion engine based on the at least one characteristic value, wherein the characteristic value is a stoichiometric air requirement of the gaseous fuel, the method including iteratively calculating, from a present value of the characteristic value, a value for a parameter of the Internal combustion engine and the detected lambda value, a new value the characteristic value, wherein a gaseous-fuel volume that results from the control of the gas valve and is fed to the combustion chamber in a previous iteration step, is utilized as the value for the parameter of the internal combustion engine, wherein a density derived from the stoichiometric air requirement is utilized for a correct metering, the new value for the stoichiometric air requirement being calculated from the gaseous-fuel volume and further variables and from the detected lambda value, the further variables being a mass of liquid fuel fed to the combustion chamber and a volume of combustion air fed to the combustion chamber.

2. The method according to claim 1, wherein a ratio of masses of gaseous fuel fed to a combustion chamber to liquid fuel is at least 1:4.

3. The method according to claim 2, wherein the ratio is at least 1:1.

4. The method according to claim 3, wherein the ratio is at least 7:3.

5. The method according to claim 4, wherein the ratio is at least 8:2.

6. The method according to claim 5, wherein the ratio is at most 9:1.

7. The method according to claim 1, including determining at least one parameter selected from a group consisting of a density, a heating value, an inert gas portion, and an H/C ratio of the gaseous fuel as an additional characteristic value.

8. The method according to claim 1, including determining the characteristic value by a characteristic value regulator, wherein a lambda value calculated by the characteristic value regulator from the characteristic value is regulated by variation of the characteristic value to the detected lambda value.

9. The method according to claim 1, including determining the characteristic value by calculating a second numerical value for the characteristic value from a value, which is dependent on or derived from a first numerical value for the characteristic value, for a parameter of the internal combustion engine and the detected lambda value, wherein the method is carried out iteratively.

10. The method according to claim 1, including determining at least one correction variable for correcting a measured value, which determines the detected lambda value, from the characteristic value, and correcting the measured value based the correction variable, and wherein a corrected detected lambda value is obtained from the corrected measured value.

* * * * *